United States Patent

Asaumi et al.

[11] Patent Number: 5,128,092
[45] Date of Patent: Jul. 7, 1992

[54] METHOD FOR SHAPING TETRAFLUOROETHYLENE RESIN PIPE

[75] Inventors: Hiroshi Asaumi, Kamakura; Takehiro Yoshida, Tokyo; Yasuo Yoda; Tomokazu Hattori, both of Yokohama, all of Japan

[73] Assignees: Nichias Corporation, Tokyo; Daikin Industries, Ltd., Osaka, both of Japan

[21] Appl. No.: 718,882

[22] Filed: Jun. 21, 1991

[30] Foreign Application Priority Data

Jun. 23, 1990 [JP] Japan .................... 2-164897

[51] Int. Cl.⁵ .................................................. B29C 43/10
[52] U.S. Cl. .................................. 264/544; 156/184; 156/194; 264/570; 264/119; 264/122; 264/127
[58] Field of Search ............... 264/544, 545, 553, 570, 264/102, 112, 119, 122, 127; 156/184, 189, 190, 194, 195

[56] References Cited

U.S. PATENT DOCUMENTS

| 2,406,127 | 8/1946 | Alfthan ............................ 264/127 |
| 2,941,911 | 6/1960 | Kumnick et al. ................. 264/127 |
| 2,964,065 | 12/1960 | Haroldson et al. .............. 156/190 |
| 3,023,787 | 3/1962 | Phillips et al. .................. 156/194 |
| 3,031,357 | 4/1962 | Balkin et al. .................... 156/190 |
| 4,203,938 | 5/1980 | Burnett et al. .................. 264/127 |
| 4,478,898 | 10/1984 | Kato ............................... 428/36 |
| 4,990,296 | 2/1991 | Pitolaj ............................ 264/162 |

FOREIGN PATENT DOCUMENTS

| 2409178 | 8/1974 | Fed. Rep. of Germany ...... 264/127 |
| 47-46454 | 11/1972 | Japan .............................. 264/127 |

Primary Examiner—Mary Lynn Theisen
Attorney, Agent, or Firm—Armstrong & Kubovcik

[57] ABSTRACT

A method for shaping a tetrafluoroethylene resin pipe which comprises:
(a) winding a porous sheet of tetrafluoroethylene resin which is not sintered around a mandrel,
(b) covering the wound sheet with an elastomeric material,
(c) isotactically pressing the wound sheet covered with the elastomeric material,
(d) removing the elastomeric material from the wound sheet, and
(e) sintering the wound sheet. According to the present invention, a dense tetrafluoroethylene resin pipe having excellent appearance and surface smoothness can be easily obtained, while maintaining the advantages inherent in the conventional winding methods.

6 Claims, 1 Drawing Sheet

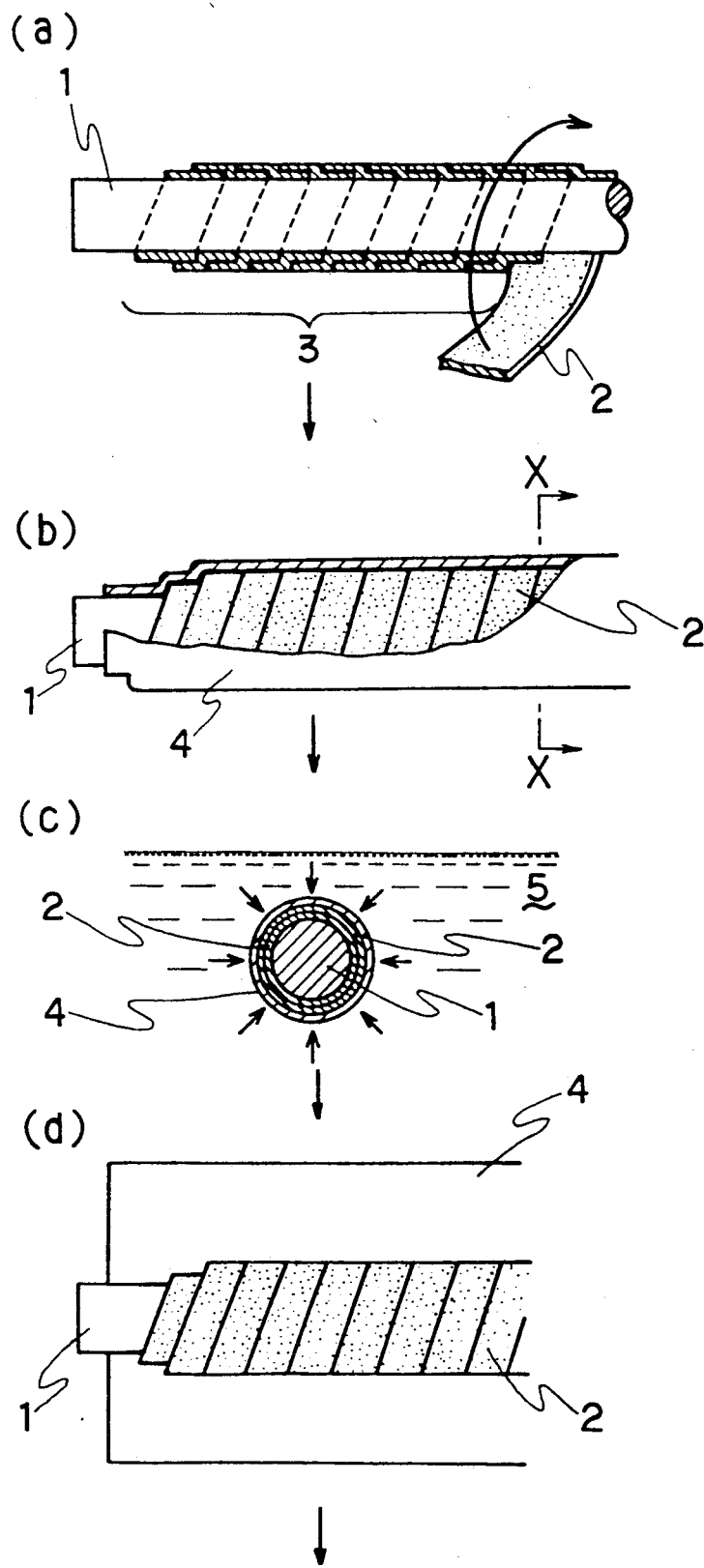

METHOD FOR SHAPING TETRAFLUOROETHYLENE RESIN PIPE

BACKGROUND OF THE INVENTION

The present invention relates to a method for shaping a pipe from a tetrafluoroethylene resin (hereinafter referred to as "TFE resin"), and more particularly to a shaping method of a TFE resin pipe wherein a TFE resin porous sheet which is not sintered is wound around a mandrel such as a bar or tube and it is sintered.

There are various methods for shaping TFE resin pipes, among which the important ones are as follows:

(I) a method wherein a mold is charged with a TFE resin powder and pressed to obtain a preform, and then the preform is sintered.

(II) a method wherein a TFE resin is extruded in a gel state with heating (so-called "ram extrusion") into a pipe.

(III) a method wherein an unsintered TFE resin sheet is wound around a mandrel and then sintered.

Among the shaping methods of TFE resin pipe, the winding method (III) is superior to other methods, because, according to the winding method (III), it is possible to obtain a pipe having a desired length or a desired thickness by controlling an amount of the TFE resin sheet to be wound, to obtain a pipe having a desired inner diameter according to an external shape of a mandrel, to easily obtain laminated pipes, and to obtain a circular and thin pipe.

The method (III) is generally conducted as follows: An unsintered TFE resin sheet is spirally wound around a mandrel having an external shape corresponding to an internal shape of a pipe to be obtained so as to overlap a turn with a next turn until the desired length and wall thickness are attained,. and it is sintered with heating. Also, reinforced pipes can be easily shaped by winding materials different from the TFE resin such as wire net, glass cloth, steel wire together with the TFE resin sheet to set the different sheet layer between the TFE resin sheet layers or on the TFE resin sheet layer, and further, a pipe provided with a flange can be shaped. (see, for instance, Japanese Examined Patent Publication No. 59-25647).

As mentioned above, though the winding method has various advantages, it also has a disadvantage such that many voids appear on sintering, thus the bulk density of the disadvantage, such a method for improvement that glass cloth is wound around the outside of the wound TFE resin sheet before sintering has been proposed, but this method has no effect when the thickness of the wound TFE resin sheet is thin, and moreover bears such a drawback that the surface of the sintered pipe turns rough.

An object of the present invention is to provide a method for shaping a TFE resin pipe which is dense and is smooth in its surface, keeping the advantages of the known winding processes.

This and other objects of the present invention will become apparent from the description hereinafter.

SUMMARY OF THE INVENTION

In accordance with the present invention, there is provided a method for shaping a tetrafluoroethylene resin pine which comprises:

(a) winding a porous sheet of a tetrafluoroethylene resin which is not sintered around a mandrel, (b) covering the wound sheet with an elastomeric material, (c) isotactically pressing the wound sheet covered with the elastomeric material, (d) removing the elastomeric material from the wound sheet, and (e) sintering the wound sheet.

BRIEF DESCRIPTION OF THE DRAWING

FIG. 1 is a typical flow-chart showing the steps of the shaping mandrel, 2 shows a porous sheet, 3 shows a wound part of the TFE resin sheet and 4 shows an elastomeric material.

DETAILED DESCRIPTION

Although the TFE resin per se has a bulk density of about 2.2 g/cm$^3$, a bulk density of a porous sheet prepared from the unsintered TFE resin is generally as low as not more than about 1.2 g/cm$^3$. Accordingly, if the TFE resin pipe is shaped by only winding the porous sheet around the mandrel, the obtained pipe does not have so high bulk density, i.e. at most about 1.5 g/cm$^3$. On the other hand, according to the method of the present invention, since the wound sheet around the mandrel is isotactically pressed to compress the sheet, the sheet is made dense prior to sintering. Accordingly, the sintered pipe can have a bulk density of about 2.2 g/cm$^3$ which is almost the same value as that of the TFE resin per se. Also, since the wound sheet is isotactically pressed. the obtained pipe is uniform in wall thickness. Further, since the wound sheet is covered with the elastomeric material, the pipe is smooth in its surface compared to the case covering with a glass cloth.

The preferable embodiment of the shaping method of the present invention is explained by means of FIG. 1.

FIG. 1 shows a typical flow-chart of the preferable embodiment of the present invention, which includes a winding step(a), a covering step(b), an isotactically pressing step(c), a removing step(d) and a sintering step (not drawn). These steps are carried out in order.

FIG. 1(a) is a figure showing that porous sheet 2 of unsintered TFE resin is wound around a mandrel 1 so as to overlap a turn with a half of the next, wherein the winding part of the wound sheet 3 is a section. Kinds and shapes of the mandrel 1, kinds of the porous sheet 2 and a winding manner are not particularly limited and any and various embodiments can be applied to the present invention.

According to winding method (III) which have hitherto been carried out, after the winding step(a), the wound sheet around the mandrel as shown in FIG. 1 (a) is sintered as it is, or after a glass sheet has been wound around the wound sheet, it is sintered. On the other handd, according to the present invention, the wound part 3 is covered with the elastomeric material 4, as shown in FIG. 1(b). [FIG. 1(b) is a schematic side view wherein only the elastomeric material is partly broken away.] It is necessary to cover at least the whole of the wound part 3 with an elastomeric material 4, in order to transmit the pressure equally to the winding part of the wound sheet and to prevent the intrusion of the liquid used as the pressure medium into the spaces formed between turns of the wound part 3 in the following step(c).

The wound sheet covered with the elastomeric material is isotactically pressed in step(c), as shown in FIG. 1(c), to increase the bulk density of the sheet. FIG. 1(c)

is a section view taken on the line X—X of FIG. 1(b), and shows that the pressure is applied in a liquid pressure medium 5.

After the wound sheet is isotactically pressed in the step(c), the elastomeric material 4 is removed as shown in FIG. 1(d), then the wound sheet is sintered in the sintering step.

With respect to the preferable embodiment of the method of the present invention, an outline is given as above. Each of the steps (a) to (d), however, is more specifically explained as follows:

As one of the unsintered TFE resin porous sheets used in the present invention, there is exemplified a porous sheet prepared a so-called paste extrusion process which comprises adding a liquid auxiliary such as naphtha to a TFE resin fine powder to give a mixture in the state of a paste, extruding the mixture, calendering the extruded sheet by using a roll to give a sheet, and removing the auxiliary from the sheet by heating at a temperature less than the sintering temperature or extracting it. Also, there can be used in the present invention a stretched porous sheet prepared by stretchign the sheet obtained in the above paste extrusion in a stretching ratio of not more than about 20. When the stretched porous sheet is used, the obtained pipe is improved in strength in the direction of stetching, compression strength and creep under compression, and is made small in coefficient of thermal expansion, gas permeability and coefficient of friction, in addition to the increase of the bulk density. The porous TFE resin sheet used in the present invention may contain one or more kind of fillers such as carbon fiber, glass fiber, graphite and carcarbon powder in an amount up to about 30% by weight of the TFE resin.

As the TFE resin used in the present invention, there are exemplified, for instance, a non-melt processable TFE resin such as tetrfluoroethylene homopolymer, a copolymer of TFE containing up to 2% by weight of chlorotrifluoroethylene, perfluoro(alkyl) vinyl ether) or hexafluoropropylene, and the like.

A size and a shape of the porous TFE resin sheet are suitably decided according to the diameter, thickness or shape of the desired pipe. In general, sheets having a width of 10 to 100 mm, preferably from 15 to 50 mm and a thickness of 0.05 to 20 mm, preferably from 0.1 to 1 mm, more particularly from 0.1 to 0.3 mm are used. Also, the porous sheet has, generally, a bulk density of about 0.1 to 1.8 g/cm$^3$, preferably from about 0.3 to 1 g/cm$^3$. In case of stretching , the stretching ratio is not more than about 20, generally not more than As the mandrel used for winding the porous sheet, any mandrel can be used so long as it has an external shape corresponding to an internal shape of a desired pipe and has a sufficient length. A metal bar or tube and a resin bar or tube which are excellent in heat resistance and water resistance are preferable from the viewpoints of the smoothness of the inside of the pipe and the durability, and further in case of sintering the sheet wound around the mandrel as it is, metal mandrels are preferable. Also, when the surface of the mandrel is plated or ground, a pipe having a smooth inside can be obtained. The external shape of the mandrel is decided according to the internal shape of the desired pipe, and can be in any section shapes such as a circle and a polygon, further a cone marked can be used.

In the present invention, the porous TFE resin sheet is wound around the mandrel by using a wrapping apparatus such as an apparatus for making a paper tube (fiber tube) while applying tension to some degree that the sheet is not creased until the desired length and the desired thickness are obtained. A turn of the wound sheet may be overlapped with, contacted with, or distant from the next. Particularly, it is preferable that a turn is overlapped with a half of the next turn. The porous sheet is wound around the mandrel at an angle of 0° to 90° to the axial direction of mandrel, generally it is spirally wound around the mandrel at an angle of 30° to 60° to the axial direction of mandrel. Also, when a different kind of a material is wound or inserted prior to, in the course of or after winding the TFE resin porous sheet, a laminated pipe comprising a TFE resin layer and a layer of a different material from TFE resin can be obtained. Examples of the different materials are, for instance, a metal net, a glass cloth, a glass paper, a fiber such as a glass yarn or a metal wire, and the like.

A length and a thickness of the wound sheet part are suitably decided according to the use of the pipe. According to the method of the present invention, a maximum length of the pipe can be made up to about 3 m and a maximum thickness of the pipe can be made up to about 50 mm. The number of turns of the wound sheet around the mandrel depends on a width and a thickness and a bulk density of the porous sheet used. Generally, the number of turns is from 5 to 500, preferably from 20 to 100.

The thus obtained, wound sheet around the mandrel proceeds to the covering step (b). In the covering step (b), the wound part 3 is covered with the elastomeric material 4 and the elastomeric material 4 is set so that the whole of the wound part 3 is wrapped in the elastomeriic material 4. The ends of the elastomeriic material 4 are sealed by using a hose band, a wire or a rubber band.

It is preferably to use a tubular one as the elastomeric material. Also, it is possible that elastomeric sheet is wound around the wound part 3 so as to overlap a turn with a half of the next while the elastomeric sheet is stretched. The covering method is not limited to the above-mentioned methods.

As to the covering the wound part 3 of the TFE resin sheet with the elastomeric material 4, it is preferable that the elastomeric material 4 adheres to the wound part 3 of the TFE resin sheet as intimate as possible so as not to enter air into spaces between the turns of the wound part 3 of the TFE resin sheet since an air well in the adjacent turns of the wound TFE resin sheet is liable to cause an insufficient adhesion of the TFE resin sheet. Accordingly, as elastomeric materials, there are exemplified a natural rubber, urethane rubber, nitrile rubber, chlorprene rubber, and the like.

After covering the wound part 3 of the TFE resin sheet with the elastomeric material 4, the wound sheet is voluntarily subjected to degasing which comprises placing the wound sheet in a vacuum of low pressure room. Then, it proceeds to the isotactically pressing step (c) [FIG. 1(c)]. In the isotactically pressing step (c), an isotactic pressure is applied to the whole of the wound sheet from the outside of the elastomeric material 4. The phrase "isotactically press" used herein means that a substantially isotactical pressure is applied in the axial direction and the perpendicular direction to the axis. In other words, in the isotactically pressing step (c), a substantially isotactical pressure is applieed to the whole of the wound sheet in the axial direction of the mandrel and the perpendicular direction to the axis. If the wound part 3 is not isotactically pressed, a pipe uniform in thickness cannot be obtained or a pipe having an internal shape which corresponds to the external shape of the mandrel cannot be btained, which are not preferable.

A pressure to be applied depends on a kind of the TFE resin sheet, a thickness of the wound sheet and a shape of the mandrel, and is generally from 100 to 500 kgf/cm$^2$, preferably from 150 to 300 kgf/cm$^2$. When the pressure to be applied is too small, it tends to leave many voids or to lower the bulk density.

The object of the isotactic press is to shape a pipe uniformly in specific gravity or thickness. Accordingly, the sheet must be maintained under pressure until the above-mentioned object is attained. The time required to maintain the wound sheet under pressure depends on the kind and the thickness of the wound sheet, and generally is not less than 2 minutes, preferably from 10 to 30 minutes. Also, the pressure can be increased continuously- or non-continuously.

To isotactically press, methods utilizing liquid pressure or gaseous pressure can be adopted. It is preferable to utilize the liquid pressure because of easy handling or inexpensive cost for equipment. When the liquid pressure is utilized, there are exemplifed a method wherein the wound sheet to be pressed is put in a pressure vessel and water or an oily liquid is forced to feed into the vessel through a pump to put the pressure for the wound sheet.

As a result of the isotactical press, the pressed, wound porous sheet becomes in the state that its internal shape corresponds to the external shape of the mandrel and its bulk density is increased to about 2.2 g/cm$^3$.

Then, the elastomeric material 4 is removed from the isotactically pressed, wound sheet in the removing step (d) [see FIG. 1(d)]. Subsequently, the sheet is sintered in the sintering step. The sheet 2 can be removed from the mandrel prior to sintering. When the wound part 3 of the TFE resin sheet is thin in thickness, it is preferable that the wound sheet around the mandrel is sintered as it is, that is, in the state that it is wound on the mandrel, to prevent the deformation.

For sintering, the same conditions as hitherto adopted for sintering TFE resin pipes can be applied for the present invention. That is, generally, thus preformed pipes are sintered at a temperature of 350° to 380° C. for 1 to 10 hours, preferably from 2 to 7 hours in an electric furnace or a gas furnace.

Then, the sintered pipe is cooled, thus, if the pipe is in the wound state around the mandrel, the pipe is removed from the mandrel. The difference of thermal expansion coefficients between the TFE resin and the material consisting of the mandrel can be made use for removing the sintered pipe from the mandrel.

According to the shaping method of the present invention, a plurality of pipes whose shapes and sizes may be the same or different can be shaped at once.

According to the method of the present invention, the following effects can be obtained.

1. The length or thickness of the pipe can be voluntarily controlled by changing the number of turns of the TFE resin sheet to be wound around the mandrel.

2. Various pipes having various shapes can be formed by changing external shape of the selected mandrel.

3. A laminate pipe consisting of different kinds of layers can be obtained by winding various kinds of materials such as wire net or glass cloth in addition to the TFE resin sheet.

4. Particularly, a thin and real circular pipe can be easily obtained.

5. When the unsintered and stretched porous sheet is used, the obtained pipe is improved in mechanical strengths and creep resistance.

6. A dense pipe with less amount of voids can be obtained.

7. A pipe having smooth inside and outside surface can be obtained.

8. A pipe having an improved tensile strength in the direction of stretching, in case of using a stretched TFE resin sheet, can be obtained.

The present invention is more specifically described and explained by means of the following Examples wherein all percents and parts are by weight unless otherwise noted. It is to be understood that the present invention is not limited to the Examples, and various changes and modifications may be made in the invention without departing from the spirit and scope thereof.

EXAMPLE 1

An unsintered porous sheet having a bulk density of 1.5 g/cm$^3$, a stretching ratio of 0%, a width of 25.4 mm and a thickness of 0.5 mm, which was formed from a fine powder of TFE resin, was wound around a stainless steel mandrel with a section of real circle (outside diameter: 100 mm) at an angle of 45° to the axial direction of the mandrel in a length of 50 cm so as to overlap a turn with a half of the next by using a winding apparatus while lightly applying tension to the sheet, the sheet going and returning the 50 cm length one and one-half (the number of plies: 6, the resultant thickness after winding: 3 mm).

The mandrel was detached from the winding apparatus after the sheet was wound, and was completely covered with a natural rubber tube and (inside diameter: 95 mm, length: 70 cm), and the both ends were strongly tied with hose bands on the rubber tube.

The stainless steel mandrel wound with TFE resin sheet and covered with rubber was placed in a liquid pressure molding machine (pressure medium: water), pressed for 5 minutes under a pressure of 300 kgf/cm$^2$, and taken away from the machine. The rubber tube was taken from the mandrel and the wound sheet around the mandrel was sintered at a temperature of 370° C. for 3 hours. After cooling it, the mandrel was removed to give a TFE resin pipe.

As to the obtained pipe, the following properties were examined by the methods stated respectively.

A bulk density was measured according to Japanese Industrial Standards (JIS) K 6889 5.2.

An inside diameter, an outside diameter and a thickness were measured at room temperature of 25° C. by using a vernier caliper.

A tensile strength and an elongation were measured according to JIS K 6891 in the axial and diametrical directions.

A compression strength was measured according to American Society for Testing Materials (ASTM) D621.

A compression modulus was measured according to ASTM D621.

A compression creep was measured by cutting from the pipe to be measured columnar specimens in the three directions of the axis, thickness and circumference, each having a diameter of 11.3 mm and a height of 10 mm, and measuring the specimens according to ASTM D621.

A hardness was measured at a temperature of 25° C. by using a durometer D.

The results are shown in Table 1.

EXAMPLES 2-6

Each of porous sheets which were not sintered shown in Table 1 was subjected to winding operation, coverting operation, isotactically pressing operation, removing operation and sintering operation in the same manner as in Example 1 except that the winding condition, pressing condition and sintering conditon as shown in Table 1 were adopted.

As to each of the obtained pipes, the physical properties were measured in the same manner as in Example 1.

The results are shown in Table 2.

As to the obtained TFE resin pipe, the physical properties were measured in the same manner as in Example 1.

The results are shown in Table 2.

COMPARATIVE EXAMPLE 4

The same TFE resin molding powder as used in Comparative Example 3 admixed with 15% of a glass fiber powder was subjected to compression molding and then sintered in the same manner as in Comparative Example 3 except that the TFE resin molding powder was pressed under a pressure of 700 kgf/cm$^2$ to give a TFE resin pipe.

As to the obtained TFE resin pipe, the physical properties were measured in the same manner as in Example 1.

TABLE 1

| Ex. No. | Ex. 1 | Ex. 2 | Ex. 3 | Ex. 4 | Ex. 5 | Ex. 6 |
| --- | --- | --- | --- | --- | --- | --- |
| Unsintered porous sheet | | | | | | |
| Material | TFE resin | TFE resin | TFE resin | TFE resin | TFE resin | TFE resin |
| Bulk Density (g/cm$^3$) | 1.5 | 1.5 | 0.8 | 0.8 | 0.33 | 0.33 |
| Elongation (%) | 0 | 0 | 145 | 145 | 446 | 446 |
| Width (mm) | 25.4 | 25.4 | 25.4 | 25.4 | 25.4 | 25.4 |
| Thickness (mm) | 0.5 | 0.5 | 0.1 | 0.1 | 0.08 | 0.08 |
| Winding conditions | | | | | | |
| The number of reciprocation | 1½ | 25 | 12½ | 200 | 27½ | 450 |
| Thickness of wound sheet (mm) | 3 | 50 | 5 | 80 | 8.8 | 144 |
| The number of plies | 6 | 100 | 50 | 800 | 110 | 1,800 |
| Pressurizing conditions | | | | | | |
| Pressure (kgf/cm$^2$) | 300 | 300 | 300 | 300 | 300 | 300 |
| Maintaining time (minute) | 5 | 30 | 5 | 30 | 5 | 30 |
| Sintering conditions | | | | | | |
| Temperature (°C.) | 370 | 370 | 370 | 370 | 370 | 370 |
| Maintaining time (hour) | 3 | 5 | 3 | 5 | 3 | 5 |

COMPARATIVE EXAMPLE 1

The procedure of Example 1 was repeated except that the step wherein the wound porous sheet around the mandrel was covered with the rubber tube and the step of isotactical compression were omitted to give a TFE resin pipe.

As to the obtained pipe, the physical properties were measuured in the same manner as in Example 1.

The results are shown in Table 2.

COMPARATIVE EXAMPLE 2

The procedure of Example 1 was repeated except that the step of covering the wound TFE resin sheet with the rubber tube was omitted to give a TFE resin pipe.

In the step for isotactically compression, water entered spaced formed between the overlapped parts of the wound TFE resin sheet. Thus, the overlapped parts did not fully adhere to one another, and a dense pipe could not be obtained.

COMPARATIVE EXAMPLE 3

A mold having a circular cavity with an outside diameter of 130 mm, an inside diameter of 110 mm and a depth of 100 mm was charged with a TFE resin molding powder (average particle size: 25 μm, commercially available under the trade mark "Polyflon M-12" from Daikin Industries, Co., Ltd.), and the TFE resin in the mold was pressed for 5 minutes under 300 kgf/cm$^2$. The obtained pipe (inside diameter: 110 mm, outside diameter: 130 mm, height: 100 mm) was sintered at a temperature of 370° C. foor 7 hours in an electric furnace.

The results are shown in Table 2.

COMPARATIVE EXAMPLE 5

The procedure of Comparative Example 4 was repeated except that a carbon fiber powder was used instead of glass fiber powder to give a TFE resin pipe.

As to the obtained pipe, the physical properties were measured in the same manner as in Example 1.

The results are shown in Table 2.

COMPARATIVE EXAMPLE 6

An unsintered TFE resin sheet having a bulk density of 1.5 g/cm$^3$, a thickness of 0.5 mm and a width of 50 mm was wound around a mandrel having a diameter of 100 mm and a length of 600 mm at an angle of 45° to the axial direction of the mandrel so as to overlap a turn with a half of the next, the sheet going and returning one and one-half the length. Then, a glass cloth tape was wound around the wound sheet in one-ply and the ends of the glass cloth tape were tied with hose bands. Subsequently, it was sintered at a temperature of 370° C. for 3 hours in an electric furnace. After cooling, the glass cloth tape was removed from the wound sheet, then the mandrel was removed from the wound sheet to give a TFE resin pipe.

As to the obtained pipe, the physical properties were measured in the same manner as in Example 1.

The results are shown in Table 2.

COMPARATIVE EXAMPLE 7

A sintered TFE resin tape having a thickness of 0.2 mm and a width of 50 mm was wound around a mandrel having a diameter of 100 mm and a length of 600 mm at an angle of 45° to the axial direction of the mandrel so as to overlap a turn with a half of the next until the number of plies was 10, around which a glass cloth tape was wound so as to overlap a turn with a half of the next, and then the ends of the glass cloth tape were tied with hose bands. Subsequently, it was sintered at a temperature of 370° for 3 hours in an electric furnace. After cooling, the glass cloth tape was removed from the wound sheet, then the mandrel was removed from the wound sheet to give a TFE resin pipe.

As to the pipe, the physical properties were measured in the same manner as in Example 1.

The results are shown in Table 2.

TABLE 2

| Ex. No | Size (mm) at 24° C. | | | Tensile strength (kgf/cm²) at 24° C. | |
|---|---|---|---|---|---|
| | Inside diameter | Outside diameter | Thickness | Axial direction | Dimetrical direction |
| Ex. 1 | 100.80 | 104.32 | 2.06 | 299.4 | 357.6 |
| Ex. 2 | 99.50 | 169.70 | 35.10 | — | — |
| Ex. 3 | 101.00 | 104.30 | 1.90 | 416.6 | 672.3 |
| Ex. 4 | 99.00 | 160.60 | 30.80 | — | — |
| Ex. 5 | 100.80 | 105.00 | 2.11 | 387.0 | 837.9 |
| Ex. 6 | 99.30 | 168.30 | 34.50 | — | — |
| Com.Ex.1 | 100.30 | 104.70 | 2.20 | 249.71 | 299.26 |
| Com.Ex.2 | — | — | — | — | — |
| Com.Ex.3 | 100.40 | 130.70 | 15.15 | 313.0*² | — |
| Com.Ex.4 | 100.20 | 130.40 | 15.10 | 330.0*² | — |
| Com.Ex.5 | 100.10 | 130.30 | 15.10 | 210.0*² | — |
| Com.Ex.6 | 99.90 | 104.10 | 2.10 | 223.2 | 363.1 |
| Com.Ex.7 | 100.20 | 104.60 | 2.20 | 386.0 | — |

| | Elongation (%) at 24° C. | | Compression strength (kgf/cm²) at 24° C. | | | Compression |
|---|---|---|---|---|---|---|
| | Axial direction | Dimetrical direction | 0.2% offset | 1% deformation | 25% deformation | modulus |
| Ex. 1 | 264.0 | 266.0 | — | — | — | — |
| Ex. 2 | — | — | 80*¹ | 60*¹ | 285*¹ | 6,100*¹ |
| Ex. 3 | 536.0 | 233.3 | — | — | — | — |
| Ex. 4 | — | — | 122*¹ | 93*¹ | 332*¹ | 6,700*¹ |
| Ex. 5 | 566.7 | 233.3 | — | — | — | — |
| Ex. 6 | — | — | 210*¹ | 120*¹ | 600*¹ | 8,500*¹ |
| Com.Ex.1 | 203.5 | 260.5 | — | — | — | — |
| Com.Ex.2 | — | — | — | — | — | — |
| Com.Ex.3 | 279.0*² | — | 73*³ | 44*³ | 280*³ | 5,700*³ |
| Com.Ex.4 | 340.0*² | — | 89*³ | 78*³ | 305*³ | 8,800*³ |
| Com.Ex.5 | 280.0*² | — | 116*³ | 89*³ | 446*³ | 9,500*³ |
| Com.Ex.6 | 336.3 | 240.0 | — | — | — | — |
| Com.Ex.7 | 313.0 | — | — | — | — | — |

| | Creep property, 140 kgf/cm², at 24° C., for 24 hours | | | Bulk density | Shore hardness |
|---|---|---|---|---|---|
| | Compresion creep | Total strain | Permanent set | (g/cm³) at 24° C. | (durometer D) |
| Ex. 1 | — | — | — | 2.184 | 58–61 |
| Ex. 2 | 8.0 | 13.4 | 6.9*¹ | 2.186 | 58–60 |
| Ex. 3 | — | — | — | 2.189 | 61–64 |
| Ex. 4 | 7.5*¹ | 12.9*¹ | 6.7*¹ | 2.190 | 60–62 |
| Ex. 5 | — | — | — | 2.188 | 60–63 |
| Ex. 6 | 7.1*¹ | 12.2*¹ | 6.0*¹ | 2.190 | 60–62 |
| Com.Ex.1 | — | — | — | 2.166 | 56–58 |
| Com.Ex.2 | — | — | — | — | — |
| Com.Ex.3 | 9.5*³ | 15.2*³ | 7.0*³ | 2.170 | 56–58 |
| Com.Ex.4 | 8.8*³ | 13.7*³ | 6.9*³ | 2.230 | 53–63 |
| Com.Ex.5 | 3.3*³ | 6.9*³ | 2.4*³ | 2.040 | 60–65 |
| Com.Ex.6 | — | — | — | 2.167 | 55–58 |
| Com.Ex.7 | — | — | — | 2.158 | 55–58 |

(Notes)
*¹measured in the axial direction
*²measured perpendicularly to the direction wherein the pressure was applied
*³measured in parallel to the direction wherein the pressure was applied The method of the present invention can provide a dense pipe having excellent appearance and surface smoothness while maintaining the advantages obtained in the conventional winding methods possess.

In addition to the ingredients used in the Examples, other ingredients can be used in the Examples as set forth in the specification to obtain substantially the same results.

What we claim is:

1. A method for shaping a tetrafluoroethylene resin pipe which comprises:

(a) winding a porous sheet of tetrafluoroethylene resin which is not sintered around a mandrel,
   (b) covering the wound sheet with an elastomeric material,
   (c) isotactically pressing the wound sheet covered with the elastomeric material,
   (d) removing the elastomeric material from the wound sheet, and
   (e) sintering the wound sheet.

2. The method of claim 1, wherein said wound sheet covered with the elastomeric material is isotactically pressed by means of liquid pressure.

3. The method of claim 1, wherein said porous sheet of tetrafluoroethylene resin which is not sintered is a porous sheet prepared by paste-extruding a tetrafluoroethylene resin fine powder into a sheet, and calendering it.

4. The method of claim 3, wherein said porous sheet is a porous sheet prepared by stretching said porous sheet prepared by paste-extruding and calendering.

5. The method of claim 1, whenever the wound sheet is sintered while wound around the mandrel.

6. The method of claim 1, wherein said porous sheet contains the least one member of filler materials.

* * * * *

UNITED STATES PATENT AND TRADEMARK OFFICE
CERTIFICATE OF CORRECTION

PATENT NO. : 5,128,092
DATED : July 7, 1992
INVENTOR(S) : ASAUMI et al It is certified that error appears in the above-identified patent and that said Letters Patent is hereby corrected as shown below:

On the title page, item [75], last line, after "Yokohama" insert--; Norimasa Honda, Tadatoshi Nakamata, both of Settsushi,--.

Signed and Sealed this

Tenth Day of August, 1993

Attest:

MICHAEL K. KIRK

*Attesting Officer*  Acting Commissioner of Patents and Trademarks